(12) United States Patent
Gupta et al.

(10) Patent No.: US 7,977,283 B2
(45) Date of Patent: Jul. 12, 2011

(54) METHOD OF MINIMIZING OR REDUCING SALT DEPOSITS BY USE OF A FLUID CONTAINING A FRUCTAN AND DERIVATIVES THEREOF

(75) Inventors: D. V. Satyanarayana Gupta, The Woodlands, TX (US); Joseph Walter Kirk, The Woodlands, TX (US); Nancy Sue Kirk, legal representative, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 262 days.

(21) Appl. No.: 12/163,274

(22) Filed: Jun. 27, 2008

(65) Prior Publication Data
US 2009/0325825 A1 Dec. 31, 2009

(51) Int. Cl.
*C09K 8/60* (2006.01)
(52) U.S. Cl. .......... 507/211; 507/90; 507/209; 507/269; 166/305.1; 166/308.6; 166/311
(58) Field of Classification Search .......... None
See application file for complete search history.

(56) References Cited

U.S. PATENT DOCUMENTS

| | | | |
|---|---|---|---|
| 3,213,018 A | 10/1965 | Roland et al. | |
| 4,109,721 A * | 8/1978 | Slusser | 166/280.2 |
| 4,352,741 A | 10/1982 | Wernau | |
| 5,777,090 A | 7/1998 | Verraest et al. | |
| 6,613,899 B1 | 9/2003 | Kuzee et al. | |
| 7,028,776 B2 | 4/2006 | Kirk | |
| 7,270,184 B2 | 9/2007 | Kotlar et al. | |
| 2002/0055567 A1 | 5/2002 | Romenesko et al. | |
| 2004/0060702 A1 | 4/2004 | Kotlar et al. | |
| 2004/0244969 A1 * | 12/2004 | Kotlar et al. | 166/246 |
| 2005/0115710 A1 * | 6/2005 | Kotlar et al. | 166/295 |
| 2006/0065396 A1 * | 3/2006 | Dawson et al. | 166/279 |
| 2006/0091572 A1 | 5/2006 | Santra et al. | |
| 2006/0124302 A1 | 6/2006 | Gupta et al. | |
| 2008/0035339 A1 | 2/2008 | Welton et al. | |
| 2008/0035340 A1 | 2/2008 | Welton et al. | |
| 2009/0291861 A1 * | 11/2009 | Sawdon | 507/110 |

OTHER PUBLICATIONS

D.M. Frigo et al.; Chemical Inhibition of Halite Scaling in Topsides Equipment; SPE 60191; 2000.

* cited by examiner

*Primary Examiner* — John J Figueroa
(74) *Attorney, Agent, or Firm* — John Wilson Jones; Jones & Smith, LLP

(57) ABSTRACT

The amount of crystallized salt in an oil and/or gas well may be minimized or reduced by use of a fructan, such as inulin, or a derivative as a salt block inhibitor. A preferred salt inhibitor is the salt of carboxyalkyl inulin such as a sodium salt of carboxymethyl inulin. The salt block inhibitor may be adsorbed onto a water-insoluble adsorbent.

25 Claims, 1 Drawing Sheet

मेथड OF MINIMIZING OR REDUCING SALT DEPOSITS BY USE OF A FLUID CONTAINING A FRUCTAN AND DERIVATIVES THEREOF

FIELD OF THE INVENTION

The invention relates to a method for minimizing or reducing the formation of salt deposits in oil and gas wells by introducing into the well a fructan, such as inulin or a derivative thereof.

BACKGROUND OF THE INVENTION

Wells drilled to produce petroleum or gas products typically also produce brine water which, often, is near or at sodium chloride saturation levels. It is not atypical for salt crystals in the brine to form a "salt block" in the well and/or flow lines into or out of the well. Salt blocks may form by the cooling of the water as oil or gas leaves the well. In gas wells, they may also be formed as the concentration of the brine increases downhole during the stripping of water vapor by the gas.

Historically, salt blocks and deposits have been treated by circulating fresh water into the well. While usually effective at dissolving the salt, this treatment can be expensive and inconvenient. In addition, fresh water may not be readily accessible at the drilling site, necessitating the transport of water over potentially long distances. Such water treatment may further require production from the well to be significantly reduced or stopped.

Salt inhibitors typically function by binding to the surfaces of salt crystals, preventing further growth of the crystal. This effectively increases the solubility of the salt in solution, as it is incapable of precipitating. Other mechanisms of action may be possible, resulting in an increased solubility of salt in solution.

Various salt inhibitors have been discussed in the literature. For instance, SPE 10097 (Society of Petroleum Engineers of AIME, Oct. 5-7, 1961) describes the evaluation of five commercially available salt inhibitors. Laboratory assays were performed to determine effectiveness in maintaining salt saturation at downhole temperatures. Tests were also performed in a Williston Basin drilling program. The chemical compositions of the inhibitors were not disclosed. U.S. Pat. No. 3,213,018 suggests the use of iron or cobalt salts as a method to inhibit deposition of sodium chloride from saturated solutions. U.S. Pat. No. 7,028,776 discloses the use of nitroliotriacetamide and its salts as a sodium chloride salt block inhibitor. In certain circumstances, the effectiveness of certain sodium chloride salt block inhibitors of the prior art, in the presence of iron ions, was weakened. Further, since such sodium chloride salt block inhibitors were generally not biodegradable, their use in offshore applications was restricted.

Alternative salt block inhibitors have been sought which do not significantly reduce production of oil or gas from producing wells, do not lose effectiveness in the presence of iron ions and are biodegradable.

SUMMARY OF THE INVENTION

The amount of crystallized salt in an oil and/or gas well may be minimized or reduced by introducing into the oil and/or gas well a fluid which contains a salt inhibitor. The oil or gas well to which the salt inhibitor is introduced may contain crystallized salts or may be subject to the formation of crystallized salts. The salt inhibitor is a fructan or a derivative thereof, including inulin or an inulin derivative. Use of the fructan or fructan derivative reduces the amount of crystallized salt in the oil and/or gas well. Preferred salt inhibitors are carboxyl-containing fructans, including a carboxyl-containing inulin, like a carboxyalkyl inulin as well as salts thereof. Particularly preferred are salts of carboxymethyl inulin, such as the sodium salt of carboxymethyl inulin.

The salt inhibitor may be adsorbed onto a water-insoluble solid adsorbent. The resulting composite may thus be used in well treating applications to prolong the effectiveness of the salt inhibitor over a long time period by being slowly released into the well.

The inhibitor is typically a component of a fluid, most typically an aqueous fluid. Addition of a foaming agent to the fluid containing the inulin or inulin derivative facilitates removal of water from the well while reducing or minimizing the precipitation of salts.

Addition of the inhibitor to a fracturing fluid further allows for placement of the inhibitor into the formation which is penetrated by the wellbore.

DESCRIPTION OF THE DRAWING

In order to more fully understand the drawing referred to herein, a brief description of the drawing is presented, in which.

DETAILED DESCRIPTION OF THE PREFERRED EMBODIMENTS

Figure 1:
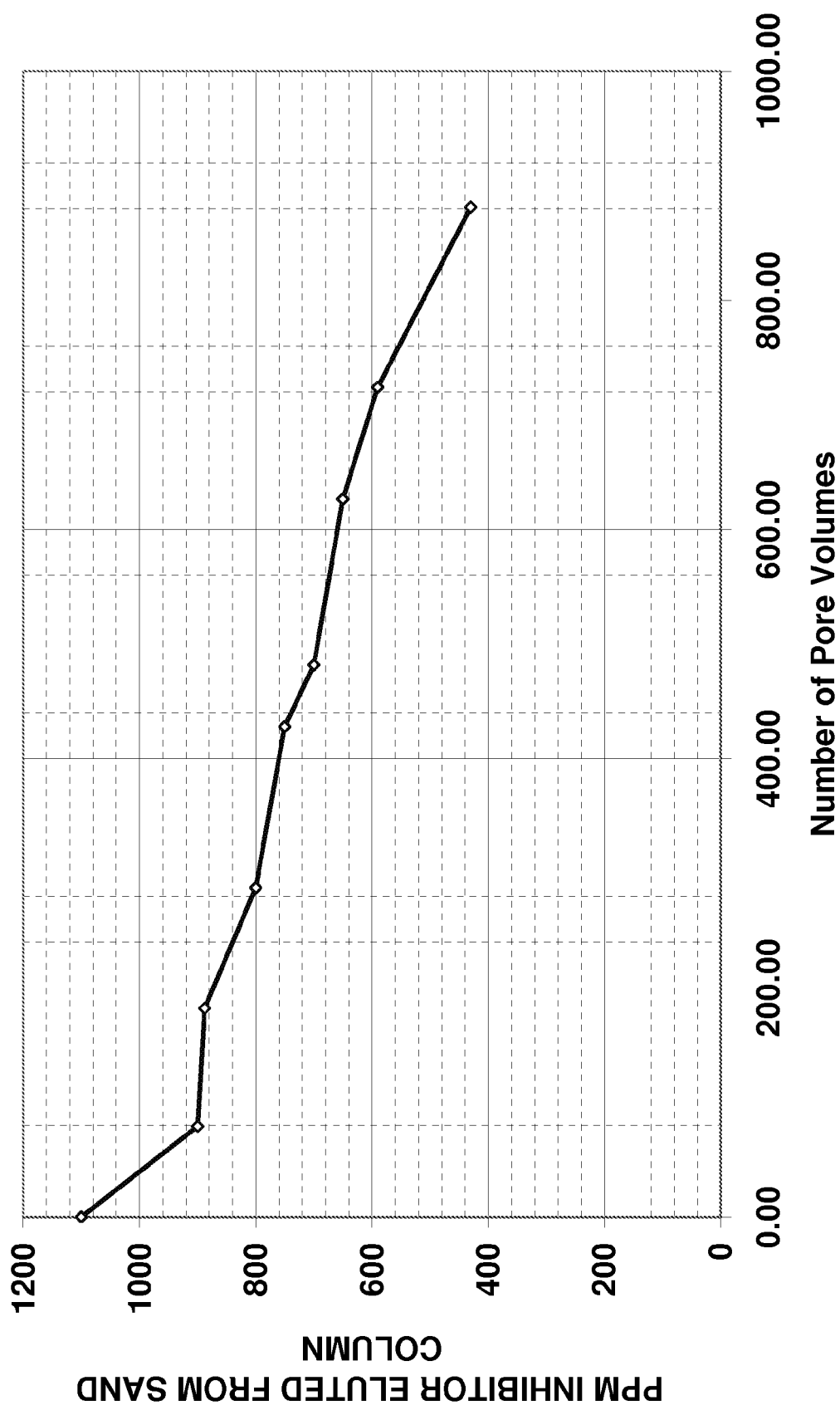
FIG. 1 illustrates the effectiveness of a composite containing a salt of a carboxymethyl inulin adsorbed onto a water-insoluble adsorbent, as set forth in Example 17.

The fructan or fructan derivative, as salt inhibitor, is introduced into the wellbore which penetrates the oil or gas producing subterranean formation. Typically, the salt inhibitor is adsorbed onto the rock in the formation, thereby allowing a sustained release of inhibitor into produced fluids over a period of time. Formation of crystallized salt in the oil and/or gas well as well as in the subterranean formation penetrated by the wellbore may be minimized or prevented. In those instances where the oil or gas well to which the salt inhibitor is introduced contains crystallized salts, the fructan or derivative is especially useful in either preventing or minimizing the formation of a salt block or reducing the amount of crystallized salt in the oil and/or gas well.

The oil or gas well to which the salt inhibitor is introduced may further be subject to the formation of crystallized salts. In such instance, use of the fructan or fructan derivative may prevent or reduce the amount of crystallized salts in the oil and/or gas well.

Preferably, the salt inhibitor is introduced into the wellbore as a component of a fluid. Suitable fluids usually comprise water and the salt inhibitor.

The fructan referenced herein encompasses all oligosaccharides and poly-saccharides which have a majority of anhydrofructose units. The fructans can have a polydisperse chain length distribution and can be straight-chain or branched. The fructan can contain mainly β-2,6 bonds, as in levan. Preferably the fructan contains mainly β-2,1 bonds, as in inulin.

The carboxyl-containing fructans are preferred. Such fructans may be a derivative of inulin or another fructan that contains 0.3-3 carboxyl groups per anhydrofructose unit. Preferably, the derivative contains at least 0.8 carboxyl groups per anhydrofructose unit. The carboxyl groups can be present in the form of carboxyalkyl groups, such as carboxymethyl, carboxyethyl, dicarboxyethyl or carboxyethoxycarbonyl groups. The carboxyl groups can also be present in the form of oxidized hydroxymethylene or hydroxymethyl groups. Preferably, the number of carboxymethyl groups is greater than the number of other carboxyl groups.

Salts of fructans are the preferred derivatives. While any salt may be used to render the salt derivative, typically salts include sodium and potassium.

Preferred salt inhibitors include carboxyalkyl derivatives, such as carboxymethyl inulin. A particularly salt inhibitor is the sodium salt of carboxymethyl inulin, especially those having an average degree of substitution (DS) (average amount of carboxymethyl groups/monosaccharide units) ranging from about 1.2 to about 2.7.

Typically, the salt inhibitor is one which prevents or minimizes the formation of a sodium chloride block and which is capable of raising the sodium chloride saturation level in produced brine water.

The concentration of the inhibitor in the fluid is that sufficient to control or prevent formation of salt deposits. Presently preferred concentrations are about 10 to about 45 volume percent, preferably from about 15 to about 40 volume percent. A fluid containing the salt inhibitor may be added as a single bolus dose, in regularly space additions or as a continuous addition. Typically, the total amount of salt inhibitor introduced into the wellbore is preferably between from about 40 ppm to about 400 ppm. Higher concentrations of inhibitor are often desirable in those instances where it is desirable to dilute existing salt deposits. Lower concentrations are more typically used when successive treatment stages of salt inhibitor are applied over shortened periods of time. The fluid may be introduced into the wellbore with a production slipstream or by use of a capillary treating string.

The salt inhibitor may further be adsorbed onto a water-insoluble solid adsorbent. Used as a composite, the salt inhibitor may be slowly released from the composite upon introduction into a targeted area. The composite therefore permits a continuous supply of the salt inhibitor into the targeted area and may be used to control the rate of release of the salt inhibitor in a production well. The controlled slow release of the salt inhibitor is dependent upon the surface charges between the salt inhibitor and adsorbent which, in turn, is dependent upon the adsorption/desorption properties of the salt inhibitor to adsorbent.

Generally, the lifetime of a single treatment using the composite is between six and twelve months depending upon the volume of water produced in the production well and the amount of salt inhibitor bound to the water-insoluble adsorbent.

The water insoluble adsorbent may be any of various kinds of commercially available high surface area materials having the affinity to adsorb the salt inhibitor. Typically, the surface area of the adsorbent of the composite is between from about 1 $m^2$/g to about 100 $m^2$/g.

Suitable adsorbents include finely divided minerals, fibers, ground almond shells, ground walnut shells, and ground coconut shells. Further suitable water-insoluble adsorbents include activated carbon and/or coals, silica particulates, precipitated silicas, silica (quartz sand), alumina, silica-alumina such as silica gel, mica, silicate, e.g., orthosilicates or metasilicates, calcium silicate, sand (e.g., 20-40 mesh), bauxite, kaolin, talc, zirconia, boron and glass, including glass microspheres or beads, fly ash, zeolites, diatomaceous earth, ground walnut shells, fuller's earth and organic synthetic high molecular weight water-insoluble adsorbents. Particularly preferred are diatomaceous earth and ground walnut shells.

Further useful as adsorbents are clays such as natural clays, preferably those having a relatively large negatively charged surface, and a much smaller surface that is positively charged. Other examples of such high surface area materials include such clays as bentonite, illite, montmorillonite and synthetic clays.

The weight ratio of salt inhibitor to water-insoluble adsorbent is generally between from about 90:10 to about 10:90.

Adsorption of the salt inhibitor onto an adsorbent reduces (or eliminates) the amount of salt inhibitor required to be in solution. Since the salt inhibitor is adsorbed onto a substrate, only a small amount of salt inhibitor may be released. When used in a composite, the amount of salt inhibitor (in the composite) released may be as low as 40 ppm in solution. Such small amounts of salt inhibitor may be sufficient for up to 1,000 pore volumes and typically provides up to six months of continuous inhibition. Costs of operation are therefore significantly lowered. Generally, the amount of salt inhibitor in the composite released into solution is that amount sufficient to effectuate the desired result over a sustained period of time and generally is between from about 0.05 to about 5 (preferably from about 0.1 to about 2) weight percent based upon the total weight of the composite.

The fluid containing the fructan or derivative (optionally in the form of a composite) further may contain a surfactant as well as a non-aqueous solvent such as methanol or ethanol.

The above described fluids can be used in hydraulic fracturing operations and allows for placement of the inhibitor into the formation. Such fluids may contain a proppant including those ultra lightweight proppants having an apparent specific gravity (ASG) less than about 2.45.

In an alternative embodiment of the invention, the wellbore may be treated first with water. An aqueous solution of salt inhibitor may then be subsequently added to the wellbore. This alternative may be desirable in those instances when solid sodium chloride deposits have already formed in the wellbore.

Addition of a foaming agent to the fluid containing the fructan or derivative facilitates removal of water from the well while reducing or minimizing the precipitation of salts. The foaming agent may be used to facilitate the removal of water from the well. Suitable foaming agents include RNB-08126 (a product of BJ Services Company), nonyl phenol ethoxylates, sulfamic acid derivatives of ethoxylated alcohols, ammonium dodecyl benzenesulfonate as well as potassium dodecyl benzenesulfonate.

Foaming agents are especially preferred in the treatment of gas wells where the release of gas in the well gradually strips water present in the well. This, in turn, increases the concentration of salt dissolved in the water. At a sufficiently high concentration, salts precipitate. The addition of a fluid containing a salt inhibitor to a gas well increases the concentration at which the salt precipitates, thereby extending the amount of time that gas can be produced without interference from the formation of salt crystals. The presence of a foaming agent in the fluid assists in the removal of water from a gas well without the associated risk of increasing precipitation of salt crystals.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLES

The following products were used in the Examples as salt inhibitors:

SPE 15625, a 25% active solution of the sodium salt of carboxymethyl inulin having a DS of 2.5±0.20, a product of Thermophos International, BV.;

Dequest PB 11625, a 40% active solution of the sodium salt of carboxymethyl inulin, having a DS of 1.25±0.04, a product of Thermophos International, BV.

Examples 1-16

50% vol/vol solutions of SPE 15625 and Dequest PB 11625 were prepared in water. A brine having a saturation level of 1.05 was prepared by mixing a first saturated brine solution containing sodium chloride with a second saturated brine solution containing sodium chloride and calcium chloride. The first saturated brine solution contained 50.0 g water and 18.65 g sodium chloride. The second saturated brine solution contained 21.92 g water, 2.0 g sodium chloride and 12.58 g calcium chloride ($CaCl_2.2H_2O$) The tests were run at 85° C. according to a procedure outlined by D. M. Frigo et al, SPE 60191.

The salt inhibitors were then completely dissolved in hot, deionized water and maintained at 85° C. An amount of inhibitor was then added to a glass French square bottle. The brine was then quickly added. The bottle was sealed and the fluid was then mixed. The bottle was then placed in an 85° C. oven (or water bath) for one hour to assure that any suspended material was re-dissolved. The bottle was then removed from the oven (or water bath) and allowed to come to ambient temperature. The undisturbed bottle was then observed for evidence of salt crystal formation at various intervals. Results for those fluids containing the SPE 15625 salt inhibitor are reported in table I and the results for those fluids containing the Dequest PB 11625 salt inhibitor are reported in Table II.

TABLE I

| Ex. No. | [Inhibitor] | Observation | Resultant |
|---|---|---|---|
| Comp. Ex. 1 | Blank - no chemical | Heavy crystal formation | No turbidity |
| 2 | 200 ppm | Some crystals - small | Slight inhibitor turbidity |
| 3 | 300 ppm | Some crystals - small | Slight inhibitor turbidity |
| 4 | 400 ppm | No crystals observed | Very slight flocculent material |
| 5 | 500 ppm | No crystals observed | Light flocculent material |
| 6 | 600 ppm | No crystals observed | Light flocculent material |
| 7 | 700 ppm | No crystals observed | Light-moderate flocculent material |
| 8 | 1000 ppm | No crystals observed | Heavy flocculent material |

TABLE II

| Ex. No. | [Inhibitor] | Observation | Resultant |
|---|---|---|---|
| Comp. Ex. 9 | Blank - no chemical | Heavy crystal formation | No turbidity |
| 10 | 200 ppm inhibitor | Some crystals - small | Slight inhibitor turbidity |
| 11 | 300 ppm inhibitor | Some crystals - small | Slight inhibitor turbidity |
| 12 | 400 ppm inhibitor | No crystals observed | No turbidity |
| 13 | 500 ppm inhibitor | No crystals observed | No turbidity |
| 14 | 600 ppm inhibitor | No crystals observed | Very Light flocculent material |
| 15 | 700 ppm inhibitor | No crystals observed | Light to moderate flocculent material |
| 16 | 1000 ppm inhibitor | No crystals observed | Moderate flocculent material |

Tables I and II demonstrate little, if any, salt formation, versus that observed in the comparative examples with the best results demonstrated with the Dequest PB 11625 salt inhibitor.

Example 17

About 800 g of 10/50 mesh diatomaceous earth (Celite MP-79) adsorbent was added into a mixing bowl and was then treated with PB 11625 until the diatomaceous earth was almost saturated with the liquid. The mixture was heated at 240° F. until the product was dry. A second amount of liquid was added to result in a saturated product and again dried by heating to 240° F. The resulting composite contained 25 weight percent active inhibitor and 75 weight percent diatomaceous earth.

Packed column studies were conducted on the composite using a supersaturated sodium chloride brine. The column was packed with 2% by weight of the composite and 98 weight percent Ottawa 20/40 sand. A pressure capable column was fitted with heat tape and a temperature controller, and the saturated sodium chloride brine was pumped under a pressure from about 2,000 to about 2,500 psi at 185° F. The volume of effluent was measured, and periodic samples were taken to determine if the effectiveness of the composite was the same as that of the sodium chloride scale inhibitor. Samples were set aside and observed for the formation of salt crystals after various numbers of pore volumes had passed through the column. The concentration of the inulin product was monitored using a standard cupric complex absorption at 770 nm. A control test was conducted with a column packed only with Ottawa 20/40 sand. The samples of the control test all showed precipitation of salt in the samples. FIG. 1 shows the concentration of the inhibitor eluted from the sand column testing after a certain number of pore volumes of supersaturated sodium chloride brine was displaced through the column. The samples even after close to 900 pore volumes of flow, showed no salt precipitation.

From the foregoing, it will be observed that numerous variations and modifications may be effected without departing from the true spirit and scope of the novel concepts of the invention.

What is claimed is:

1. A method of reducing the amount of crystallized salt in an oil and/or gas well comprising introducing into an oil and/or gas well containing crystallized salt a fluid comprising a water soluble salt inhibitor selected from the group consisting of water soluble fructans and derivatives thereof and reducing the amount of crystallized salt in the oil and/or gas well.

2. The method of claim 1, wherein the salt inhibitor is a salt of a fructan.

3. The method of claim 2, wherein the salt inhibitor is a sodium salt of a fructan.

4. The method of claim 1, wherein the salt inhibitor is inulin or a derivative thereof.

5. The method of claim 4, wherein the salt inhibitor is a carboxyalkyl inulin.

6. The method of claim 5, wherein the salt inhibitor is a salt of carboxyalkyl inulin.

7. The method of claim 5, wherein the salt inhibitor is carboxymethyl inulin.

8. The method of claim 6, wherein the salt inhibitor is a salt of carboxymethyl inulin.

9. The method of claim 8, wherein the salt inhibitor is a sodium salt of carboxymethyl inulin.

10. The method of claim 1, wherein the concentration of the salt inhibitor in the fluid is from about 10 to about 45 volume percent.

11. The method of claim 10, wherein the concentration of the salt inhibitor in the fluid is from about 15 to about 40 volume percent.

12. The method of claim 1, wherein the fluid is continuously added into the oil and/or gas well.

13. The method of claim 1, wherein the fluid further comprises a foaming agent.

14. The method of claim 1, wherein the fructan or derivative thereof is adsorbed onto a water-insoluble adsorbent.

15. The method of claim 14, wherein the surface area of the adsorbent is between from about 1 $m^2/g$ to about 100 $m^2/g$.

16. The method of claim 14, wherein the water-insoluble adsorbent is selected from the group consisting of activated carbon, silica particulate, precipitated silica, zeolite, diatomaceous earth, ground walnut shells, fuller's earth and organic synthetic high molecular weight water-insoluble adsorbents.

17. The method of claim 16, wherein the water-insoluble adsorbent is diatomaceous earth or ground walnut shells.

18. The method of claim 1, wherein the fluid is a fracturing fluid.

19. The method of reducing the amount of crystallized salt in an oil and/or gas well comprising introducing into an oil and/or gas well containing crystallized salt a fluid comprising a water soluble salt of carboxymethyl inulin.

20. The method of claim 19, wherein the salt of carboxymethyl inulin is a sodium salt.

21. A method of reducing the amount of crystallized sodium chloride salt in an oil and/or gas well comprising introducing into an oil and/or gas well a fluid comprising a water soluble sodium chloride salt block inhibitor selected from the group consisting of water soluble inulin and derivatives thereof, raising the level of sodium chloride saturation in the fluid and reducing the amount of crystallized sodium chloride salt in the oil and/or gas well.

22. The method of claim 21, wherein the salt inhibitor is a salt derivative of inulin.

23. The method of claim 21, wherein the salt inhibitor is a salt derivative of a carboxymethyl inulin.

24. The method of claim 23, wherein the salt inhibitor is a sodium salt of carboxymethyl inulin.

25. A method of preventing the formation of crystallized salt in an oil and/or gas well which is subject to the formation of crystallized salts which comprises introducing into the oil and/or gas well a fluid comprising a water soluble salt inhibitor selected from the group consisting of water soluble inulin and derivatives thereof and preventing the formation of crystallized salts therein.

\* \* \* \* \*